United States Patent
Remaker

(10) Patent No.: US 9,220,007 B2
(45) Date of Patent: Dec. 22, 2015

(54) WIRELESS ACCESS POINT MAC ADDRESS PRIVACY

(75) Inventor: Phillip A. Remaker, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 85 days.

(21) Appl. No.: 13/029,959

(22) Filed: Feb. 17, 2011

(65) Prior Publication Data

US 2012/0213211 A1   Aug. 23, 2012

(51) Int. Cl.
*H04W 4/00* (2009.01)
*H04W 12/02* (2009.01)
*H04L 29/06* (2006.01)
*H04L 29/12* (2006.01)
*G01S 5/02* (2010.01)
*H04W 48/08* (2009.01)
*H04W 64/00* (2009.01)

(52) U.S. Cl.
CPC ............. *H04W 12/02* (2013.01); *G01S 5/0226* (2013.01); *H04L 61/2053* (2013.01); *H04L 61/2092* (2013.01); *H04L 61/6022* (2013.01); *H04L 63/0421* (2013.01); *H04W 48/08* (2013.01); *H04W 64/00* (2013.01)

(58) Field of Classification Search
None
See application file for complete search history.

(56) References Cited

U.S. PATENT DOCUMENTS

| | | | | |
|---|---|---|---|---|
| 8,194,586 | B2 * | 6/2012 | Mizukoshi | 370/328 |
| 8,578,488 | B2 * | 11/2013 | Park et al. | 726/22 |
| 2007/0083470 | A1 * | 4/2007 | Bonner et al. | 705/51 |
| 2008/0175246 | A1 * | 7/2008 | Kunhappan et al. | 370/392 |
| 2008/0259885 | A1 * | 10/2008 | Faulkner et al. | 370/338 |
| 2009/0074187 | A1 * | 3/2009 | Inoue et al. | 380/270 |
| 2010/0063889 | A1 * | 3/2010 | Proctor et al. | 705/21 |

OTHER PUBLICATIONS

"Airraid—Create fake, wireless access points (APs) with Atheros chipset cards," Pettingers.org, Geek Stuff, 2007: pp. 1-4, <http://www.pettingers.org/code/airraid.html>.
Narten et al., "RFC 3041—Privacy Extensions for Stateless Address Autoconfigur," Advameg, Inc., faqs.org, Jan. 2001: pp. 1-17, <http://www.faqs.org/rfcs/rfc3041.html>.

* cited by examiner

*Primary Examiner* — Kibrom T Hailu
(74) *Attorney, Agent, or Firm* — Patterson + Sheridan, LLP

(57) ABSTRACT

The present disclosure describes techniques for using varying MAC addresses to provide wireless access point MAC address privacy. A wireless access point may be configured to generate a random (or pseudo-random) MAC address to use on a wireless-side interface (and SSID broadcast), rather than using the burned-in MAC address. The wireless access point may be further configured to periodically change the wireless-side MAC address with a newly generated one whenever user-configurable triggering conditions are satisfied. As a result, a MAC address learned by a wi-fi sniffing device becomes obsolete shortly after being learned and cannot be used to correlate the actual location of the access point with the MAC address for any significant period of time.

24 Claims, 5 Drawing Sheets

WIRELESS ACCESS POINT MAC ADDRESS PRIVACY

TECHNICAL FIELD

Embodiments presented in this disclosure generally relate to computer network security. More specifically, embodiments presented herein relate to wireless access point Media Access Control (MAC) address privacy.

BACKGROUND

Wireless networks have become commonplace. For example, many people use a wireless access point to provide an internet connection to multiple TCP/IP enabled devices within their home. The access points typically operate using a version of the IEEE 802.11 wireless local area network standards (i.e., the 802.11a, b, g or n standards). Desktop PCs, laptop PCs, mobile telephones, VoIP telephones, tablet PCs, net-books, video game consoles, among other devices, can all connect to wireless networks operating according to these standards.

Wireless access points come configured with a globally unique 48-bit quantity assigned to every interface. This address is commonly called a "burned-in" MAC (Media Access Control) address. In the process of communicating with other wireless devices, this address is exposed to any receiver within range of the transmitted signal. Even when no communication is active, the access point typically exposes the burned-in MAC address as part of a periodically transmitted service-station identifier (SSID) broadcast. The SSID broadcast is used by wireless devices to identify the network associated with the wireless access point, as well as to obtain information used to send a request to attach to the wireless network, e.g., to obtain information used to generate a Dynamic Host Configuration Protocol (DHCP) request for an internet protocol address.

As noted, wireless access points typically broadcast the burned-in MAC address as part of normal operation. While the 802.11 standards allow the SSID broadcast to be disabled, the overwhelming majority of access points leave the SSID broadcast active. As a result, anyone with a wireless device can obtain the MAC address simply by being within range of the access point (typically 100 meters or less), and wi-fi sniffing devices are readily available which can collect this information. Further, large coordinated collection efforts have resulted in databases of information that correlate geophysical location data with the burned-in MAC address of access points. Thus, in some cases, the MAC address of a given access point can be used to learn the geophysical location of that access point. Combining the availability of these databases with the ability of malicious software to learn the MAC address of an access point, without needing to be within physical proximity to the access point, results in an exploit technique which may result in the unwanted disclosure of a person's general location.

BRIEF DESCRIPTION OF THE DRAWINGS

So that the manner in which the present disclosure can be understood in detail, a more particular description of the disclosure is set forth below. It is to be noted, however, that the appended drawings illustrate only typical embodiments of this disclosure and are therefore not to be considered limiting of its scope, for the disclosure may admit to other equally effective embodiments.

DESCRIPTION

Overview

Figure 1:
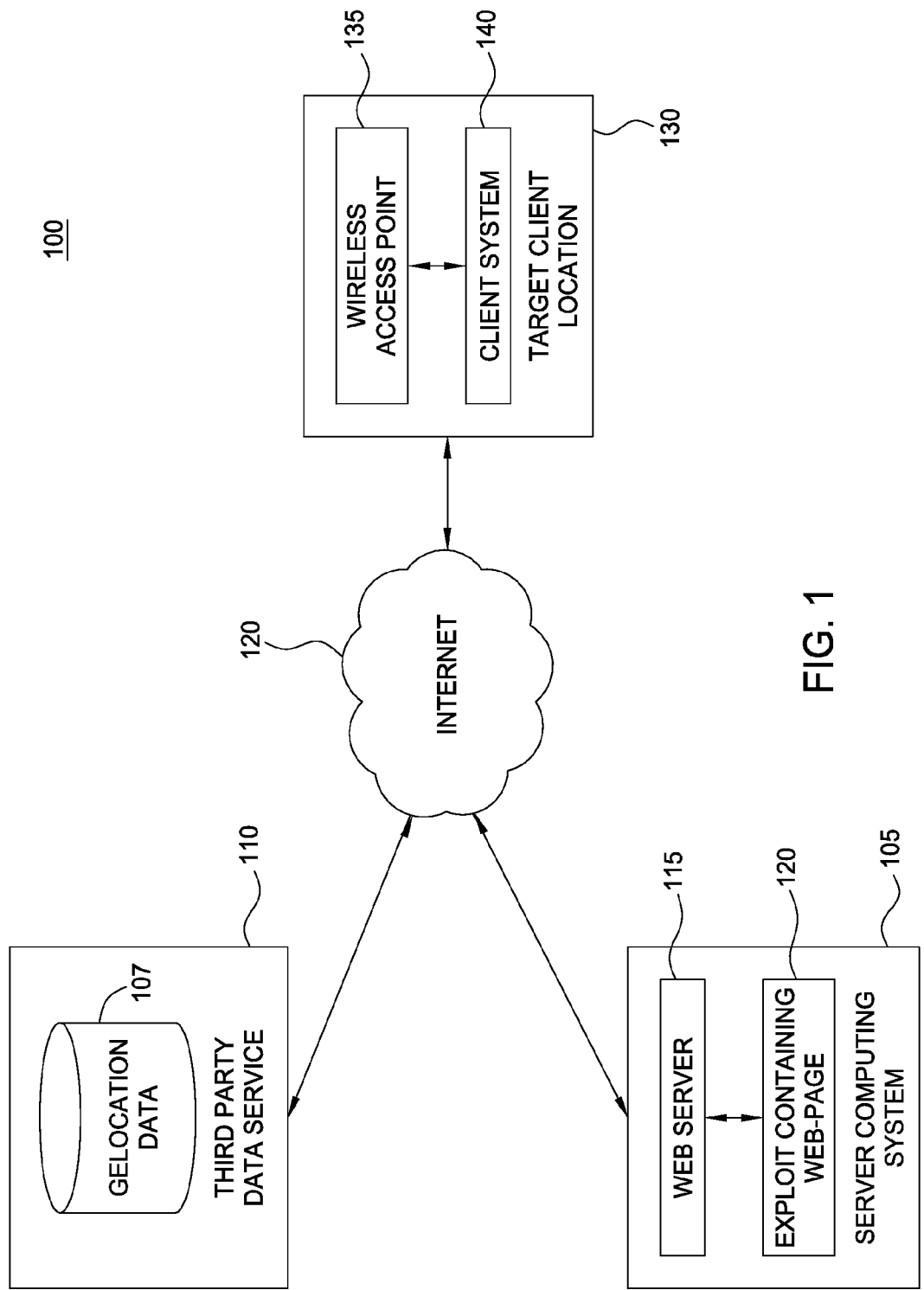
FIG. 1 illustrates an example computing infrastructure used to exploit a burned-in MAC address of a wireless access point in order to learn the geophysical location of that access point, according to certain embodiments of the present disclosure.

Embodiments presented herein relate to wireless access point MAC address privacy. One embodiment provides a computer-implemented method. This method may generally include obtaining a first Media Access Control (MAC) address to assign to a wireless-side interface of a wireless access point, identifying one or more triggering conditions for automatically changing the first MAC address assigned to the wireless-side interface to a second MAC address. Upon determining one of the triggering conditions has been satisfied, the second MAC address is obtained. The second MAC address then replaces the first MAC address assigned to the wireless-side interface with the second MAC address.

Additional embodiments include, but are not limited to including, a computer readable storage medium, storing a program configured to perform the aforementioned method, and a system having a processor and a memory storing a program configured to perform the aforementioned method.

DESCRIPTION OF EXAMPLE EMBODIMENTS

Embodiments presented herein may be used to increase individual privacy by preventing a burned-in MAC address on a wireless access point from being used to identify a geophysical location of that access point. A database of GPS coordinates correlated to MAC addresses can be built simply by driving down public roads with the appropriate wi-fi sniffing equipment, recording the information in any SSID broadcasts, and correlating MAC addresses with the GPS coordinates at which each SSID broadcast was observed. Further, this simple approach has been used to build large, publically-accessible databases covering virtually the entire United States (and other countries). Thus, given the burned-in MAC address of an access point, it may be trivial to obtain a physical location of that access point (at least at the time the SSID broadcast was observed). However, as wireless access points are generally stationary, the correlation between an observed MAC address and the location of the access point may remain correct for long periods of time.

Further still, in some cases, an attacker may obtain the burned-in MAC address of an access point remotely by getting a target user to visit a malicious web-site or exploiting other vulnerabilities of a given client attached to the access point. For example, the attacker could send an email message to the target user with a link to a webpage that includes script components executed by a client browser. The script components could attempt to connect to the management interface of different access points, and if successful, obtain and transmit the burned-in MAC address to the attacker. Similarly, an attacker may use the IP address of a given host (or the access point itself) in an attempt to exploit other vulnerabilities on the host (or the access point) to obtain the burned in MAC address (e.g., from the ARP (Address Resolution Protocol) table of a network interface on a client attached to the wireless network). However obtained, the MAC address may then be used to identify the geophysical location of the access point from publically accessible databases.

FIG. 1 illustrates an example computing infrastructure 100 used to exploit a burned-in MAC address of a wireless access point 135 in order to learn the geophysical location of the access point 135, according to certain embodiments of the present disclosure. As shown, the computing infrastructure 100 includes a network server computing system 105, a third-party data service 110 and a client system 140 at a target client location 130.

Illustratively, the target client location 130 includes a wireless access point 135 and a client system 140. The client system 140 is connected to a wireless network provided by the wireless access point 135, and in turn, the wireless access point 135 provides an uplink to network 120 (e.g., to the internet). Client system 130 is included to be representative of any computing device which can attach to the wireless network provided by the wireless access point 135. Accordingly, examples of client system 130 include desktop or laptop computers as well as netbooks, tablet devices, game consoles, mobile phones, and other handheld devices, among others.

The wireless access point 135 may be part of an integrated routing device providing a wireless network, layer-3 routing services and a broadband connection to the internet, e.g., a DOCSIS cable-modem or DSL modem. Alternatively, the wireless access point 135 may have a wired connection to such a routing device. As part of normal operation, the wireless access point 135 may generate an SSID broadcast, which allows a client device to attach to the wireless network provided by access point 135.

At the same time, however, the SSID broadcast may be observed by a roaming wi-fi sniffer and recorded in geolocation data 107 made available by third-party data service 110. For example, a wi-fi sniffer may include a compute device, a wi-fi receiver, a GPS receiver, application programs and local storage. The sniffer may listen for signals from wireless access point 135 when it enters within broadcast range of client location 130, correlate the learned MAC address to a GPS location, store the information and eventually load it to geolocation data 107.

Accordingly, in the present context, the geolocation data 107 may include recorded observations of MAC addresses broadcast from access points (e.g., access point 135) along with GPS (or other location) data, tying the MAC address of a given access point address to a particular geophysical location.

Further, an attacker may use server computing system 105 to host an exploit containing web-page 120 served by webserver 115, configured to obtain the MAC address of wireless access point 135. Provided the attacker can cause a user of the client system 140 to access web-page 120, the attacker may be able to learn the MAC address of the wireless access point 135. And once obtained, the attacker can simply access the geolocation data 107 provided by the third party data service 110 to obtain the last observed geophysical location of the wireless access point 135. Of course, other approaches may be used to obtain the MAC address of the wireless access point 135 (e.g., by exploiting other vulnerabilities of the client system 140). Accordingly, in one embodiment, the wireless access point 135 may be configured to use a randomly generated MAC address for an SSID broadcast. Further, such an address may be changed on a periodic (or event-driven) basis. Doing so prevents the burned-in MAC address from being used to accurately identify the physical location of the access point 135.

Embodiments described herein provide an approach to prevent this type of attack, i.e., prevent the burned-in MAC address from being used to identify the physical location of that access point. In one embodiment, a wireless access point may be configured to generate a random (or pseudo-random) MAC address to use on the wireless-side interface (and the SSID broadcast), rather than using the burned-in MAC address. As described below, doing so prevents possible compromises to personal privacy.

Further, the varying MAC address may be rotated on an event-driven or periodic basis with minimal disruption to established wireless communication. Thus, a MAC address observed by a roaming wi-fi sniffer becomes obsolete shortly after being observed, enhancing privacy with no impact to end users. However, since changing a MAC address disrupts connectivity for any connected clients, the events may be selected to minimize any disruption to such clients.

Note, the present description is presented to enable one of ordinary skill in the art to make and use the proposed techniques. Descriptions of specific embodiments and applications are provided only as examples and various modifications will be readily apparent to those skilled in the art. The general principles described herein may be applied to other embodiments and applications without departing from the scope of the disclosure. Thus, the present disclosure is not to be limited to the embodiments shown, but is to be accorded the widest scope consistent with the principles and features described herein. For purpose of clarity, features relating to technical material that is known in the technical fields related to the proposed ideas have not been described in detail.

Figure 2:
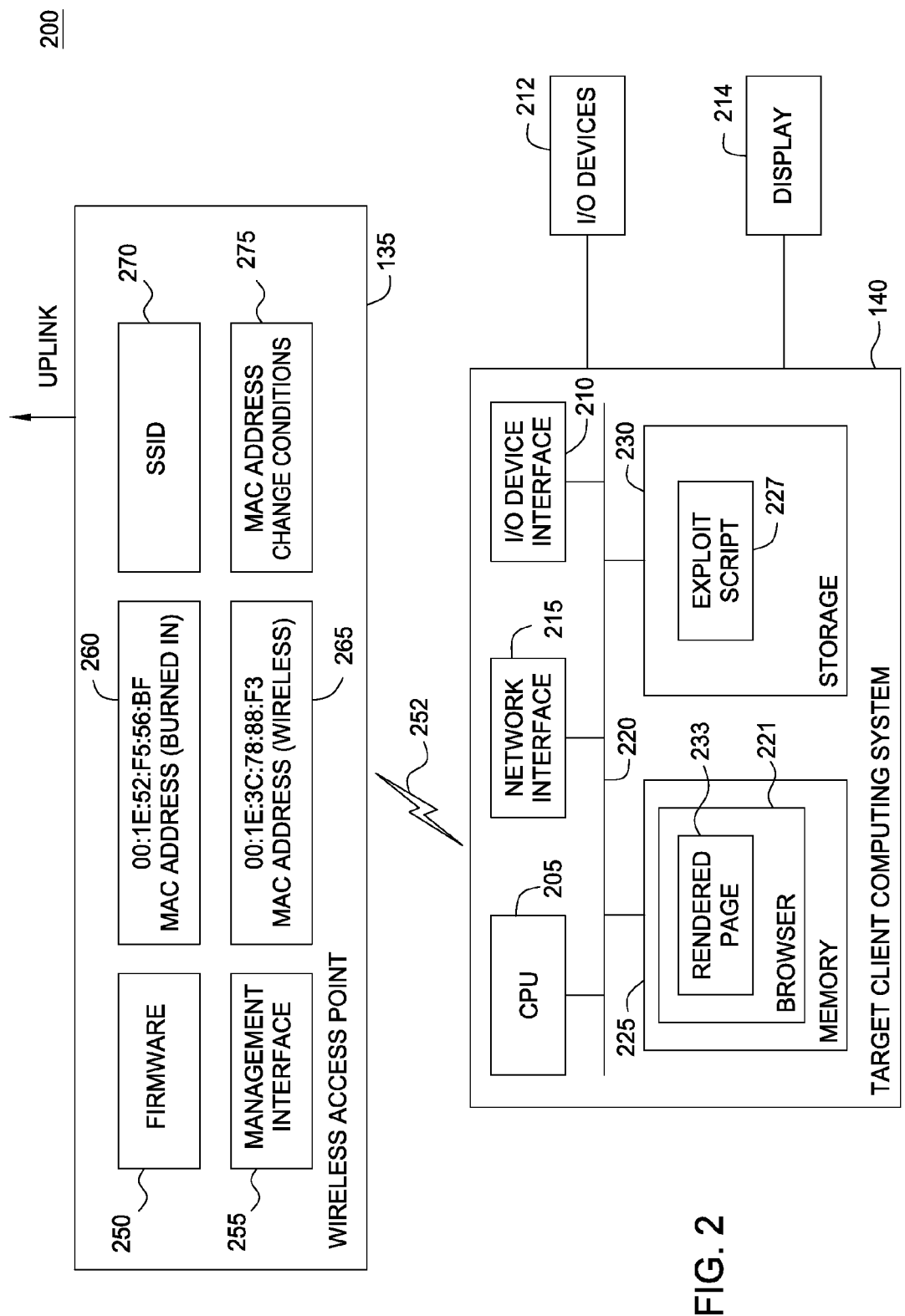
FIG. 2 illustrates an example of a wireless access point configured to provide wireless access point MAC address privacy, according to certain embodiments of the present disclosure.

FIG. 2 illustrates an example of the client system 140 and the wireless access point 135 first shown in FIG. 1, according to certain embodiments of the present disclosure. As shown, the client system 140 includes, without limitation, a central processing unit (CPU) 205, a network interface 215, an interconnect 220, a memory 225, and storage 230. The content server 105 may also include an I/O device interface 210 connecting I/O devices 212 and a display 214 to the computing system 140 (e.g., a keyboard, mouse, and display screen).

The CPU 205 retrieves and executes programming instructions stored in the memory 225. Similarly, the CPU 205 stores and retrieves application data residing in the memory 225. The interconnect 220 facilitates transmission, such as programming instructions and application data, between the CPU 205, I/O devices interface 210, storage 230, network interface 215, and memory 225. CPU 205 is included to be representative of a single CPU, multiple CPUs, a single CPU having multiple processing cores, and the like. The memory 225 is generally included to be representative of a random access memory. The storage 230 may be, but is not limited to being, a disk drive or solid state (SSD) storage drive. The network interface 215 is used by the client system 140 to connect to a wireless network 252 provided by the access point 135.

Illustratively, the memory 225 includes a web browser 221 and a rendered web page 233, and storage 230 includes an exploit script 227 (or other stored program code). The exploit script 227 may be configured to attempt to connect to a management interface 255 of the wireless access point 135 to obtain the burned in MAC address 260, and, if successful, transmit the burned-in MAC address 260 to the attacker.

For example, the target computing system 140 may run some form of network-accessing software (like web browser 221). The web browser 221 (or other network-accessing software) may include a defect or misconfiguration that allows a malicious site to deliver exploit script 227 to target system 140. Once delivered, the exploit script 227 may command the vulnerable device to execute script 227 or alter security settings in a way that allows the attacker to command the target system 140 with the script 227 (injected in or compromised) to collect the MAC address (260 or 265) from the access point 135. Of course, a web browser is just one of many programs that may have a bug or misconfiguration to allow a remote attacker to ask target system 140 to use network interface 215 to request 260 or 265 from access point 135.

As shown, the wireless access point 135 includes a firmware 250, a management interface 255, a burned-in MAC address 260, a wireless-side MAC address 265, SSID data 270, MAC address change conditions 275 and routing data 280. In one embodiment, the management interface 255 allows a user to configure the access point 135. For example, wireless access points commonly include a web-based interface which allows users to specify a variety of settings on the access point 135 such as an SSID value, whether the SSID value is broadcast, network settings, firewall settings and the like.

In context of the present disclosure, the management interface 255 may also allow a user to specify whether to enable the use of random MAC addresses for the wireless-side interface of the access point 135, as well as specify change conditions 275 identifying when the wireless-side MAC address 265 should be changed. The change conditions 275 could include, e.g., the number of attached client devices dropping below a specified count or to zero, the time of day, an amount of time with no traffic over the wireless interface, as well as combinations of these events. As an example, the change conditions 275 could specify to generate a new random wireless-side MAC address 265 at 3:00 AM, provided no MAC address change has occurred in the past twelve hours. As another example, a change condition 275 could be based on a specified number of failed attempts to access the management interface 255 (presumably by an exploit script 227). Of course, one of ordinary skill in the art will recognize that a variety of different criteria could be used as MAC address change conditions 275.

The firmware 250 may be configured to generate a (random or pseudorandom) MAC address to use on the wireless interface of the access point 235. For example, the firmware 250 may include a random number generator (seeded with the current time each time a new wireless-side MAC address is needed). Alternatively, the wireless access point could be configured to connect to a network service to obtain a random seed (or a random MAC address value).

As shown in FIG. 2, the wireless-side MAC address 265 has been set to "00:1 E:3C:78:88:F3." This value (along with the SSID 270) is then used as the source MAC address for all communication from the access point 135. As the wireless-side MAC address 265 is both random and transient, even should the exploit script 227 successfully obtain the then current value for the wireless-side MAC address 265, it does not remain correlated to the geophysical location of the access point 135, as found in a geolocation data 107 of a third-party data service 110. Instead, provided the wireless-side MAC address 265 is changed with some frequency, then the MAC address observed by a wi-fi sniffer in an SSID broadcast does not become a proxy for correlating the physical location of the wireless access point 135 for extended periods of time.

Figure 3:
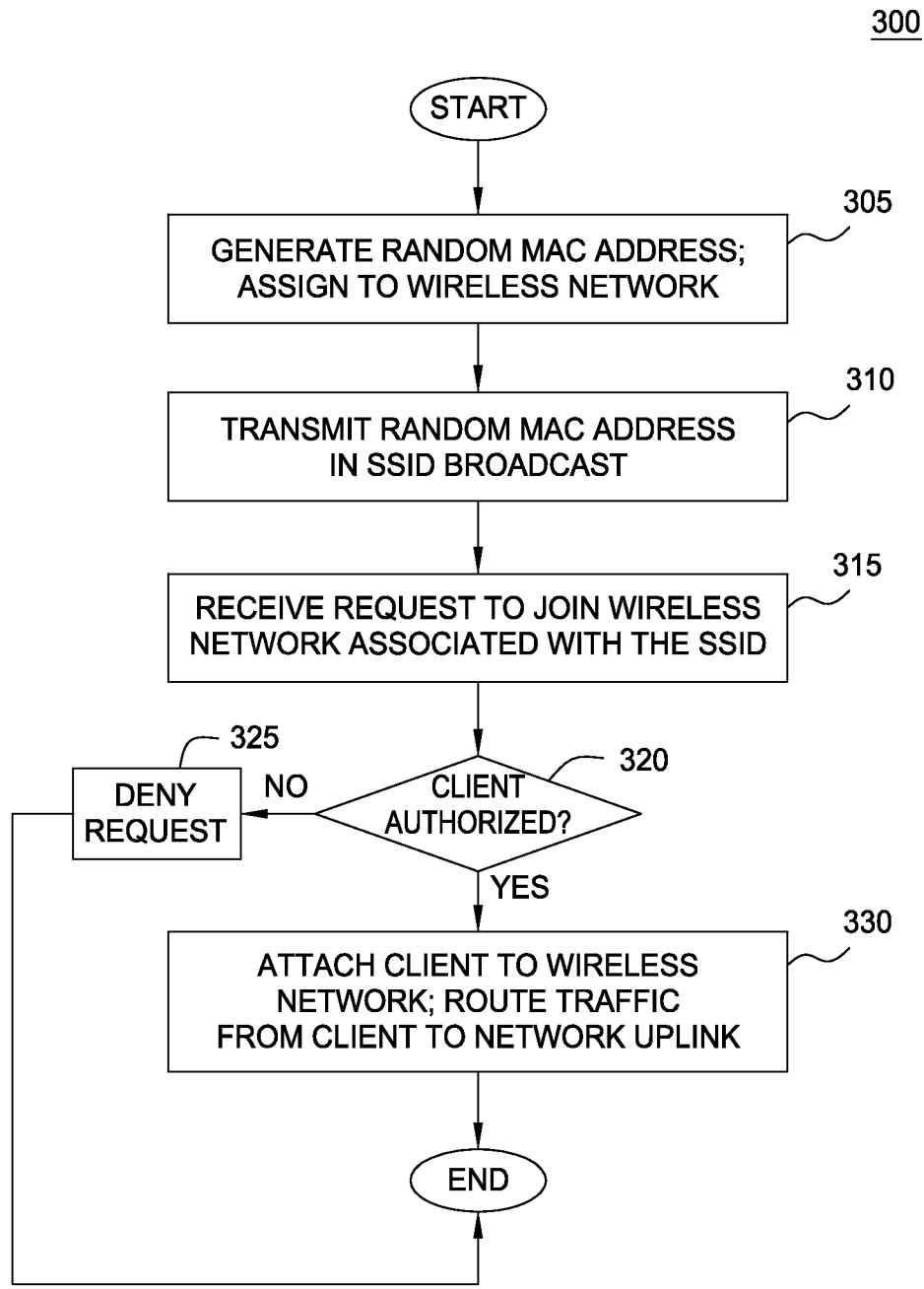
FIG. 3 illustrates a method for managing a wireless network configured to provide wireless access point MAC address privacy, according to certain embodiments of the present disclosure.

FIG. 3 illustrates a method 300 for managing a wireless network configured to provide wireless access point MAC address privacy, according to certain embodiments of the present disclosure. As shown, the method 300 begins at step 305 where an access point generates a random MAC address to assign to a wireless-side interface. Once generated, at step 310, the random MAC address is used in SSID broadcasts identifying the presence of the wireless network. As noted, such a broadcast is readily observed by any wi-fi sniffing device within range of the access point.

At step 315, the wireless access point receives a request to join the wireless network associated with the SSID. At step 320, the wireless access point determines whether the request was received from an authorized client, i.e., the wireless access point may require client authentication. For example, the access point may be configured to use the known WEP, WPA or WPA2 protocols. In such a case, a client needs to supply the correct wireless network password before the access point will allow that client to join the wireless network. If the client is not authorized, then the request is denied (step 325). Otherwise, if the client successfully authenticates itself (or if the wireless network does not require clients to be authenticated), then at step 325, the wireless access point attaches the client to the wireless network and begins routing traffic between the client device and a network uplink.

Figure 4:
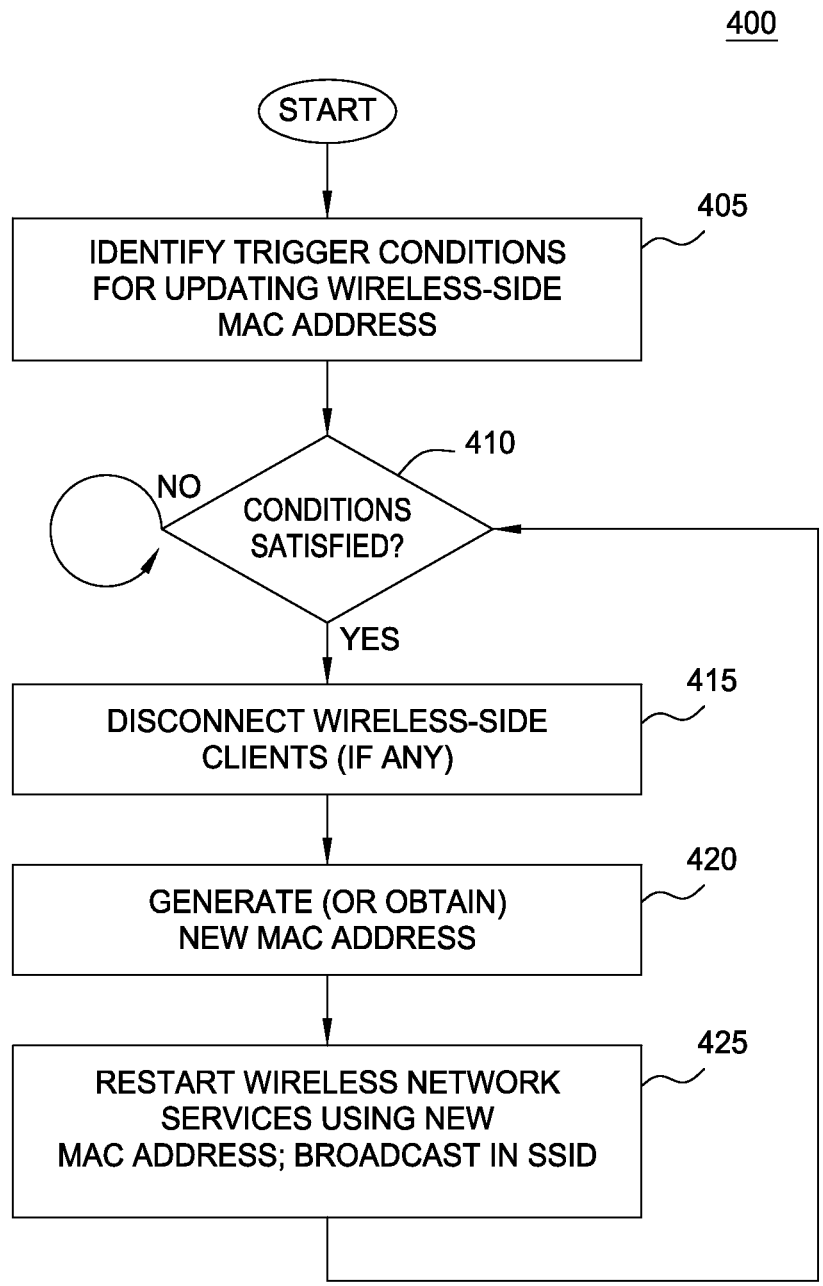
FIG. 4 illustrates a method for managing a wireless-side MAC address in order to provide wireless access point MAC address privacy, according to certain embodiments of the present disclosure.

FIG. 4 illustrates a method 400 for managing a wireless-side MAC address in order to provide wireless access point MAC address privacy, according to certain embodiments of the present disclosure. As shown, the method 400 begins at step 405, where a wireless access point identifies a set of conditions for updating a wireless-side MAC address.

At step 410, the wireless access point determines whether any of the conditions for changing the MAC address are satisfied. As noted, the conditions can be based on a variety of condition, including the number of attached client devices dropping below a specified count (or to zero), the time of day, an amount of time with no traffic over the wireless interface, suspected intrusion attempts, as well as combinations of these events. In one embodiment, the firmware on the wireless access point may periodically evaluate the conditions for regenerating the wireless-side MAC address. Alternatively, the firmware may be exception based. In such a case, the occurrence of a triggering event may result in an exception being thrown, and as a result, the firmware generates a new wireless-side MAC address. For example, in one embodiment, the firmware might contact the third-party data service to see whether the current MAC address is listed in the database and change it if found.

At step 415, once a MAC address change condition is satisfied, the wireless access point disconnects any connected clients (if any). That is, the wireless access point shuts down the wireless network provided by the wireless-side interface of the access point. At step 420, the wireless access point generates a new MAC address to assign to the wireless-side interface. As noted, the firmware may include a random number generator used to generate the new wireless-side MAC address. Alternatively, the wireless access point may connect to a network service to obtain a random value (or randomly generated MAC address value).

However obtained, at step 425, the wireless access point assigns the newly generated MAC address to the wireless-side interface and begins broadcasting this MAC address in SSID broadcasts. Thus, any clients disconnected at step 415 will reconnect to the access point using the new MAC address. Following step 425, the method returns to step 410 until another MAC address change condition is satisfied, and another new MAC address is generated for use on the wireless-side interface. This step of method 400 may be repeated for as long as the wireless access point remains active.

Figure 5:
FIG. 5 illustrates an example management interface of a wireless access point configured to provide wireless access point MAC address privacy, according to certain embodiments of the present disclosure.

FIG. 5 illustrates an example management interface 500 of a wireless access point configured to provide wireless access point MAC address privacy, according to certain embodiments of the present disclosure. In this example, the management interface provides a web-page rendered on a web-browser. As shown, a user has selected a MAC security tab 502, which allows the user to specify when a new wireless-side MAC address should be generated. Illustratively, a radio button 505 is used to enable (or disable) the use of random MAC addresses. When disabled, the wireless access point may revert to using the burned-in MAC address on the wireless-side interface.

In this particular example, the interface 500 includes a checkbox 510, which allows a user to specify whether active clients should be disconnected when such conditions are satisfied, as well as set of controls 515 which allow a user to configure the conditions for updating the wireless-side MAC address. As shown, a user has enabled the use of random MAC addresses, as well as specified that active clients should be disconnected, if necessary. Further, the user has specified that the wireless-side MAC address should be updated with a new value once every hour as well as after three suspected intrusion attempts have occurred (e.g., after three attempts to connect to the management interface with an incorrect password).

As described, a wireless-side MAC address of a wireless access point may be rotated on an event-driven or periodic basis with minimal disruption to established wireless communication. As a result, MAC addresses learned by roamers become inaccurate shortly after being learned. Thus, advantageously, embodiments presented herein may be used to increase individual privacy by preventing a burned-in MAC address on a wireless access point from being used to identify a geophysical location of that access point. In one embodiment, a wireless access point may be configured to generate a random (or pseudo-random) MAC address to use on the wireless-side interface (and the SSID broadcast), rather than using the burned-in MAC address and further configured to periodically update that MAC address with a newly generated one whenever user-configurable triggering conditions are satisfied.

While the forgoing is directed to embodiments of the present disclosure, other and further embodiments of the disclosure may be devised without departing from the basic scope thereof. For example, aspects of the present disclosure may be implemented in hardware or software or in a combination of hardware and software. One embodiment of the disclosure may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive, flash memory, ROM chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored. Such computer-readable storage media, when carrying computer-readable instructions that direct the functions of the present disclosure, are embodiments of the present disclosure.

In view of the foregoing, the scope of the present disclosure is determined by the claims that follow.

I claim:
1. A computer-implemented method, comprising:
    assigning a first Media Access Control (MAC) address to a wireless-side interface of a wireless access point, wherein the wireless-side interface facilitates wireless communications between client systems and the wireless access point, and wherein the first MAC address is communicated to the client systems during the wireless communications as part of service station identifier (SSID) messages broadcast by the wireless access point; and
    upon determining one or more triggering conditions for automatically changing the first MAC address assigned to the wireless-side interface of the wireless access point to a second MAC address have been satisfied based on at least one of (i) the number of currently attached client devices being less than a predetermined threshold number of client devices and (ii) the amount of time where no traffic has passed over the wireless interface exceeding a predetermined threshold amount of time:
        disconnecting all client systems currently connected to the wireless access point via the wireless-side interface;
        determining the second MAC address; and
        re-assigning the second MAC address to the wireless-side interface of the wireless access point, thereby replacing the first MAC address assigned to the wireless-side interface of the wireless access point, wherein the second MAC address is then included in subsequent SSID messages broadcast by the wireless access point.
2. The method of claim 1, wherein at least one of the triggering conditions specifies a period of time to wait before replacing the first MAC address assigned to the wireless-side interface with the second MAC address.
3. The method of claim 1, wherein at least one of the triggering conditions specifies a count of failed attempts to access a management interface of the wireless access point allowed before replacing the first MAC address assigned to the wireless-side interface with the second MAC address.
4. The method of claim 1, wherein at least one of the triggering conditions specifies a time of day at which to replace the first MAC address assigned to the wireless-side interface with the second MAC address.
5. The method of claim 1, wherein at least one of the triggering conditions specifies to replace the first MAC address assigned to the wireless-side interface with the second MAC address after a specified interval of network inactivity on the wireless-side interface of the wireless access point.
6. The method of claim 1, wherein determining the second MAC address comprises generating, by the wireless access point, without intervention from any external server, the second MAC address using a pseudo-random function executed on the wireless access point.
7. The method of claim 1, wherein determining the first MAC address and the second MAC address comprises invoking, by the wireless access point, a network service configured to return a random MAC address value.

8. A non-transitory computer-readable storage medium storing code for execution by a processor, wherein the code, when executed by the processor, performs an operation, comprising:

assigning a first Media Access Control (MAC) address to a wireless-side interface of a wireless access point, wherein the wireless-side interface facilitates wireless communications between client systems and the wireless access point, and wherein the first MAC address is communicated to the client systems during the wireless communications as part of service station identifier (SSID) messages broadcast by the wireless access point; and upon determining one or more triggering conditions for automatically changing the first MAC address assigned to the wireless-side interface of the wireless access point to a second MAC address have been satisfied based on at least one of (i) the number of currently attached client devices being less than a predetermined threshold number of client devices and (ii) the amount of time where no traffic has passed over the wireless interface exceeding a predetermined threshold amount of time:

disconnecting all client systems currently connected to the wireless access point via the wireless-side interface;

determining the second MAC address; and re-assigning the second MAC address to the wireless-side interface of the wireless access point, thereby replacing the first MAC address assigned to the wireless-side interface of the wireless access point, wherein the second MAC address is then included in subsequent SSID messages broadcast by the wireless access point.

9. The computer-readable storage medium of claim 8, wherein at least one of the triggering conditions specifies a period of time to wait before replacing the first MAC address assigned to the wireless-side interface with the second MAC address.

10. The computer-readable storage medium of claim 8, wherein at least one of the triggering conditions specifies a count of failed attempts to access a management interface of the wireless access point allowed before replacing the first MAC address assigned to the wireless-side interface with the second MAC address.

11. The computer-readable storage medium of claim 8, wherein at least one of the triggering conditions specifies a time of day at which to replace the first MAC address assigned to the wireless-side interface with the second MAC address.

12. The computer-readable storage medium of claim 8, wherein at least one of the triggering conditions specifies to replace the first MAC address assigned to the wireless-side interface with the second MAC address after a specified interval of network inactivity on the wireless-side interface of the wireless access point.

13. The computer-readable storage medium of claim 8, wherein determining the second MAC address comprises generating, by the wireless access point, without intervention from any external server, the second MAC address using a pseudo-random function executed on the wireless access point.

14. A wireless access point, comprising:
a processor; and
a memory storing management firmware which, when executed on the processor, performs an operation, comprising:

assigning a first Media Access Control (MAC) address to a wireless-side interface of a wireless access point, wherein the wireless-side interface facilitates wireless communications between client systems and the wireless access point, and wherein the first MAC address is communicated to the client systems during the wireless communications as part of service station identifier (SSID) messages broadcast by the wireless access point; and upon determining one or more triggering conditions for automatically changing the first MAC address assigned to the wireless-side interface of the wireless access point to a second MAC address have been satisfied based on at least one of (i) the number of currently attached client devices being less than a predetermined threshold number of client devices and (ii) the amount of time where no traffic has passed over the wireless interface exceeding a predetermined threshold amount of time:

disconnecting all client systems currently connected to the wireless access point via the wireless-side interface;

determining the second MAC address; and re-assigning the second MAC address to the wireless-side interface of the wireless access point, thereby replacing the first MAC address assigned to the wireless-side interface of the wireless access point, wherein the second MAC address is then included in subsequent SSID messages broadcast by the wireless access point.

15. The wireless access point of claim 14, wherein at least one of the triggering conditions specifies a period of time to wait before replacing the first MAC address assigned to the wireless-side interface with the second MAC address.

16. The wireless access point of claim 14, wherein at least one of the triggering conditions specifies a count of failed attempts to access a management interface of the wireless access point allowed before replacing the first MAC address assigned to the wireless-side interface with the second MAC address.

17. The wireless access point of claim 14, wherein at least one of the triggering conditions specifies a time of day at which to replace the first MAC address assigned to the wireless-side interface with the second MAC address.

18. The wireless access point of claim 14, wherein at least one of the triggering conditions specifies to replace the first MAC address assigned to the wireless-side interface with the second MAC address after a specified interval of network inactivity on the wireless-side interface of the wireless access point.

19. The wireless access point of claim 14, wherein the wireless access point determines the second MAC address by generating, by the wireless access point, without intervention from any external server, the second MAC address using a pseudo-random function executed on the wireless access point.

20. The method of claim 1, wherein at least one of the triggering conditions specifies that the first MAC address is published in a database correlating the first MAC address with a physical location of the access point, and wherein the disconnecting, determining the second MAC address and re-assigning are performed further responsive to a determination that the first MAC address is published within the database.

21. The computer-readable storage medium of claim 8, wherein at least one of the triggering conditions specifies that the first MAC address is published in a database correlating the first MAC address with a physical location of the access point, and wherein the disconnecting, determining the second MAC address and re-assigning are performed further responsive to a determination that the first MAC address is published within the database.

22. The system of claim 14, wherein at least one of the triggering conditions specifies that the first MAC address is published in a database correlating the first MAC address with a physical location of the access point, and wherein the disconnecting, determining the second MAC address and re-assigning are performed further responsive to a determination that the first MAC address is published within the database.

23. The method of claim 1, wherein the wireless access point includes a burned-in MAC address that is distinct from both the first MAC address and the second MAC address, further comprising:
- providing, on the wireless access point, a user interface for configuring the wireless access point; and
- responsive to a selection within the user interface specifying to disable the use of random MAC address, assigning the burned-in MAC address to the wireless-side interface of the wireless access point, thereby replacing the second MAC address re-assigned to the wireless-side interface of the wireless access point, wherein the burned-in MAC address is then included in subsequent SSID messages broadcast by the wireless access point.

24. The method of claim 1, wherein the wireless access point provides network access to a first network for two or more client systems connected to the wireless access point via the wireless-side interface and that have been successfully authenticated by the wireless access point.

* * * * *